A. J. GOING.
Cotton-Seed Planter.

No. 85,379.

Patented Dec. 29, 1868.

Witnesses

Inventor
A. J. Going

A. J. GOING, OF CLINTON, LOUISIANA.

Letters Patent No. 85,379, dated December 29, 1868.

IMPROVEMENT IN COTTON-SEED PLANTERS.

The Schedule referred to in these Letters Patent and making part of the same.

*To all whom it may concern:*

Be it known that I, A. J. GOING, of Clinton, in the parish of East Feliciana, and State of Louisiana, have invented a new and useful Improvement in Cotton-Seed Planters; and I do hereby declare that the following is a full, clear, and exact description thereof, which will enable those skilled in the art to make and use the same, reference being had to the accompanying drawings, forming part of this specification.

This invention relates to a new, simple, and useful device for agitating cotton-seed in the hoppers of cotton-seed planters, so as to insure the separation of the seed, one from the other, and thereby prevent the clogging or choking up of the hopper, and effect a proper distribution of the seed from the same.

In the accompanying sheet of drawings—

Figure 1:
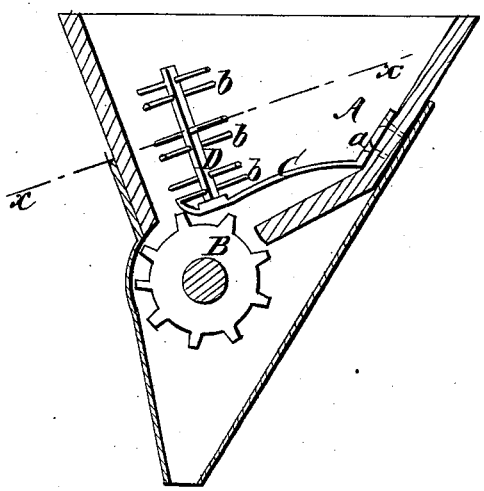

Figure 1 is a vertical central section of the hopper of a cotton-seed planter provided with my invention.

Figure 2:
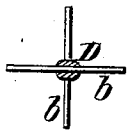

Figure 2, a detached sectional view of the agitator taken in the line $x\ x$, fig. 1.

Similar letters of reference indicate corresponding parts.

A represents the hopper of a cotton-seed planter, which may be constructed in any of the known forms, and has fitted within it a revolving toothed wheel, B, or a revolving shaft, provided with arms or projections, to draw the cotton-seed downward and discharge it from the hopper.

C is a spring, which may be made of steel, and is attached, at one end, to the inner side of the hopper, as shown at $a$ in fig. 1.

The free or disengaged end of this spring is curved slightly upward, as shown in fig. 1, so that the teeth or arms B, while rotating, may strike against it, and impart to spring C a vibrating motion.

To the free or disengaged end of the spring C there is attached an arbor or shaft, D, through which arms or rods, $b$, pass at right angles, as shown clearly in fig. 2.

This arbor or shaft, with the arms passing through it, constitutes what I term an agitator, and has, of course, a vibrating motion with the spring C.

From the above description, it will be seen that the agitator will keep the seed in the upper part of the hopper in a light, loose state, and effectually prevent it from choking or clogging in the hopper, so that an equal or uniform distribution of the seed will be insured.

I claim as new, and desire to secure by Letters Patent—

An agitator for a cotton-seed planter, composed of a spring, C, having an arbor or shaft, D, attached, through which transverse rods or arms, $b$, pass, the agitator being secured in the hopper, and arranged in relation with the seed-discharging device, to operate in the manner substantially as and for the purpose set forth.

A. J. GOING.

Witnesses:
CHARLES P. DELEE,
JAMES NESOM.